United States Patent
Blanding et al.

(10) Patent No.: US 9,515,905 B1
(45) Date of Patent: Dec. 6, 2016

(54) MANAGEMENT OF MULTIPLE SCALE OUT WORKLOADS

(75) Inventors: William H. Blanding, Bow, NH (US); Bryan L. Backer, Altadena, CA (US); Jerry J. Harrow, Jr., Brookline, NH (US); Dan Herington, Dallas, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1476 days.

(21) Appl. No.: 12/289,678

(22) Filed: Oct. 31, 2008

(51) Int. Cl.
G06F 15/173 (2006.01)
H04L 12/26 (2006.01)

(52) U.S. Cl.
CPC ........... *H04L 43/08* (2013.01); *H04L 43/0876* (2013.01)

(58) Field of Classification Search
USPC .................................................. 709/223–226
See application file for complete search history.

(56) References Cited

U.S. PATENT DOCUMENTS

| | | | |
|---|---|---|---|
| 5,675,739 A * | 10/1997 | Eilert et al. ................... | 709/226 |
| 5,881,238 A * | 3/1999 | Aman et al. .................. | 709/226 |
| 6,170,011 B1 * | 1/2001 | Macleod Beck et al. .... | 709/224 |
| 6,289,382 B1 * | 9/2001 | Bowman-Amuah ......... | 709/226 |
| 6,332,163 B1 * | 12/2001 | Bowman-Amuah ......... | 709/231 |
| 6,438,594 B1 * | 8/2002 | Bowman-Amuah ......... | 709/225 |
| 6,496,850 B1 * | 12/2002 | Bowman-Amuah ......... | 709/203 |
| 6,578,068 B1 * | 6/2003 | Bowman-Amuah ......... | 709/203 |
| 7,058,826 B2 * | 6/2006 | Fung ............................. | 713/300 |
| 7,089,361 B2 * | 8/2006 | Borkenhagen ................ | 711/129 |
| 7,143,153 B1 * | 11/2006 | Black et al. .................. | 709/223 |
| 7,746,801 B2 * | 6/2010 | Mathieu et al. ............... | 370/252 |
| 7,822,594 B2 * | 10/2010 | Haviv et al. .................... | 703/21 |
| 2002/0073189 A1 * | 6/2002 | Koontz et al. ................ | 709/223 |
| 2003/0097428 A1 * | 5/2003 | Afkhami et al. ............. | 709/220 |
| 2004/0111513 A1 * | 6/2004 | Shen ............................. | 709/226 |
| 2005/0044197 A1 * | 2/2005 | Lai ................................ | 709/223 |
| 2006/0085530 A1 * | 4/2006 | Garrett ......................... | 709/223 |
| 2007/0028244 A1 * | 2/2007 | Landis et al. ................. | 718/108 |
| 2008/0082983 A1 * | 4/2008 | Groetzner et al. ........... | 718/105 |
| 2008/0123559 A1 * | 5/2008 | Haviv et al. .................. | 370/255 |
| 2010/0107172 A1 * | 4/2010 | Calinescu et al. ........... | 718/104 |

\* cited by examiner

*Primary Examiner* — Hua Fan
(74) *Attorney, Agent, or Firm* — Dickinson Wright

(57) ABSTRACT

A scale out workload management system executing on a computer system controls simultaneous execution of multiple workloads. The computer system includes multiple nodes, where each node defines computer resources consumable by a workload. The scale out workload management system includes an application manager coupled to the nodes. The application manager controls start up and shut down of the nodes based on demands placed on the workloads. The scale out workload management system further includes a workload manager coupled to the application manager. The workload manager includes a monitor module that collects performance information from nodes on which the workloads are executing, an aggregator module that collects the performance information and aggregates the performance information from all nodes supporting the workloads, and a comparator module that compares aggregated performance information for the workloads to a performance target and determines if an allocation of nodes to the workloads should be changed.

10 Claims, 3 Drawing Sheets

MANAGEMENT OF MULTIPLE SCALE OUT WORKLOADS

BACKGROUND

In a distributed computing system, i.e., a computing system that uses multiple nodes to complete various tasks, a specific workload may be executed on differing numbers of nodes, depending, for example, on the resources resident at those nodes, as well as on the demands placed on the workload. For example, a Web server application (workload) may experience an increased demand during the late afternoon/early evening compared to the demand experienced during the early morning. Such a demand increase may dictate use of additional nodes to ensure satisfactory performance of the Web server application. Thus, the number of nodes assignable to the workload may vary during execution of that workload. Currently, assignment of workloads among nodes, or other computing system resource assignment to workloads, is done using manual means; i.e., a computer system user makes the assignments of resources to workloads. These current methods are slow and often result in less than optimum assignment of resources to workloads. Because the current methods are slow, computer systems on which these manual processes are practiced cannot quickly adapt to the frequent changes that occur in resource demand from the workloads.

SUMMARY

A scale out workload management system executing on a computer system controls simultaneous execution of multiple workloads. The computer system includes multiple nodes, where each node defines computer resources consumable by a workload. The scale out workload management system includes an application manager coupled to the nodes. The application manager controls start up and shut down of the nodes based on demands placed on the workloads. The scale out workload management system further includes a workload manager coupled to the application manager. The workload manager includes a monitor module that collects performance information from nodes on which the workloads are executing, an aggregator module that collects the performance information and aggregates the performance information from all nodes supporting the workloads, and a comparator module that compares aggregated performance information for the workloads to a performance target and determines if an allocation of nodes to the workloads should be changed.

DESCRIPTION OF THE DRAWINGS

The detailed description will refer to the following drawings in which like numerals refer to like objects, and in which.

DETAILED DESCRIPTION

When executing on a multi-processor computer system, a particular workload may have its individual routines, subroutines, instructions, and other functions executed at more than one computing node. That is, the workload may be thought of as a multi-instance workload, with each instance being executed at a separate computing node. Such distribution of workload to execution environments may be referred to as "scale out." Thus, the workload execution may be distributed, or scaled out, over separate computing nodes, and the computing nodes may be hardware instances of processors, and/or over partitions within a specific processor. The processors may be distributed over multiple computing platforms, including servers. Furthermore, multiple multi-instance workloads may be executing at any one time. The herein disclosed scale out workload management system, and corresponding method, allow for the automatic monitoring and assignment of multiple scale out workloads among a heterogeneous pool of computing nodes that comprise a computer system which supports scale out workload management. This automatic monitoring and assignment of multiple scale out workload is more efficient and less expensive than prior art manual means.

Figure 1:
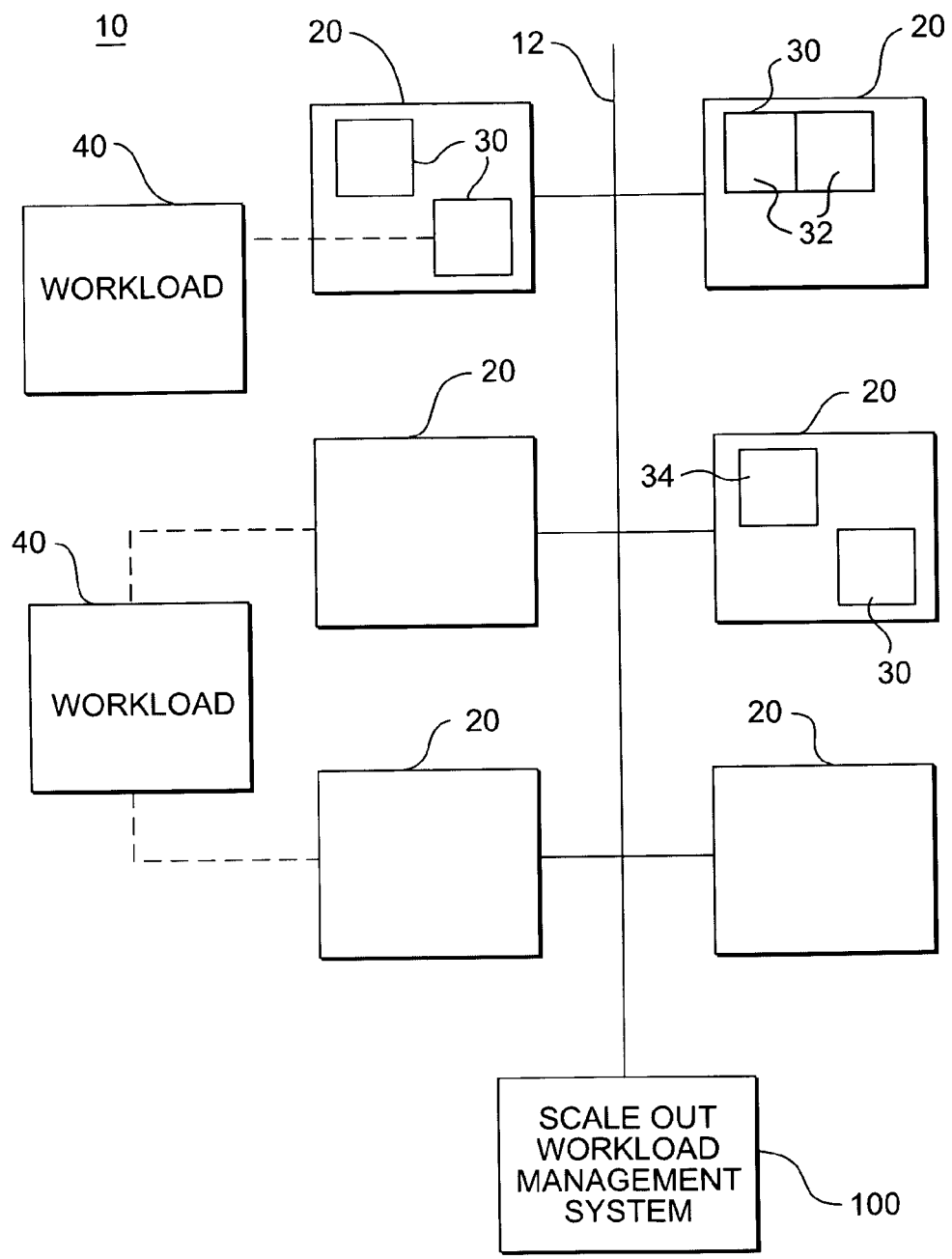
FIG. 1 illustrates an exemplary computing system on which scale out workload management of multiple scale out workloads is implemented.

FIG. 1 is a block diagram of an exemplary computer system 10 on which simultaneous scale out workload management of multiple scale out workloads is implemented. The computer system 10 includes multiple instances of processors 30 physically located at servers 20, with the servers 20 connected by network 12. At least some processors 30 additionally may be partitioned into two or more partitions, 32, as shown. Finally one or more virtual machines 34 may be defined for the computer system 10. The system 10 also includes multiple workloads 40 that execute on one or more of the computing nodes, and a scale out workload management system 100 that performs specific monitoring and control functions related to the workloads 40 and other components of the computer system 10.

Although the discussion that follows will refer to the processor resources of computing nodes (whether or not partitioned) and virtual machines, and physical and logical servers, those skilled in the art will recognize that such computing nodes may include other resource types other than processors, such as memory and bandwidth, for example. Furthermore, the discussion will refer to resource instances, which means a specific instantiation. Alternatively, the resources instances, when referring to processors, partitions, virtual machines, and servers, may be labeled as execution environments or nodes.

In the exemplary computer system 10, scale out workload management system 100 is used to manage demand on the scale out workloads 40 and to control assignment of resources (execution environments or nodes) to the workloads 40 so as to optimize computer system performance, particularly to minimize consumption of resources and their related energy usage while ensuring that desired performance targets for the workloads 40 are met. The scale out workload management system 100, which will be described in more detail with reference to FIG. 2, applies to use of whole physical servers, hard or soft partitions of physical servers, and virtual machines, so long as these servers, partitions and virtual machines can be defined by a logical server instance, and have that logical server instance execute on them.

When executing, each scale out workload 40 is assigned to certain processors 30 and/or partitions 32, and the workload 40 in whole or in part as assigned, executes on the processor 30 or partition 32. Ideally, the assignment of processors 30 and partitions 32 would be matched to the demands of the workloads 40 such that execution of the workloads 40 occurs at some minimum resource cost, such as at the point of minimum energy consumption. That is, if more processors 30 and/or partitions 32 than necessary are assigned to a specific workload 40, operation of the processors/partitions 30/32 will occur at a higher energy consumption cost than is necessary. Thus, optimizing the assignment of workloads 40 to processors/partitions 30/32 may lead to cost savings by reducing electrical demand to operate the processors/partitions 30/32, and by reducing the cooling load imposed by operation of the excess processors/partitions 30/32.

In order to achieve the desired performance targets established for the workloads 40 while minimizing computer system resource consumption, an automated scale out workload management system 100 is disclosed. The scale out workload management system 100 provides for reduced costs attendant with execution of the workloads 40 and better matching of resources to actual workload demand than can be achieved with current, largely manual, workload management systems. In addition, automatic management of heterogeneous resources (e.g., both virtual machines and physical machines) provides more flexibility than managing only homogeneous resources (e.g., just virtual machines).

Figure 2:
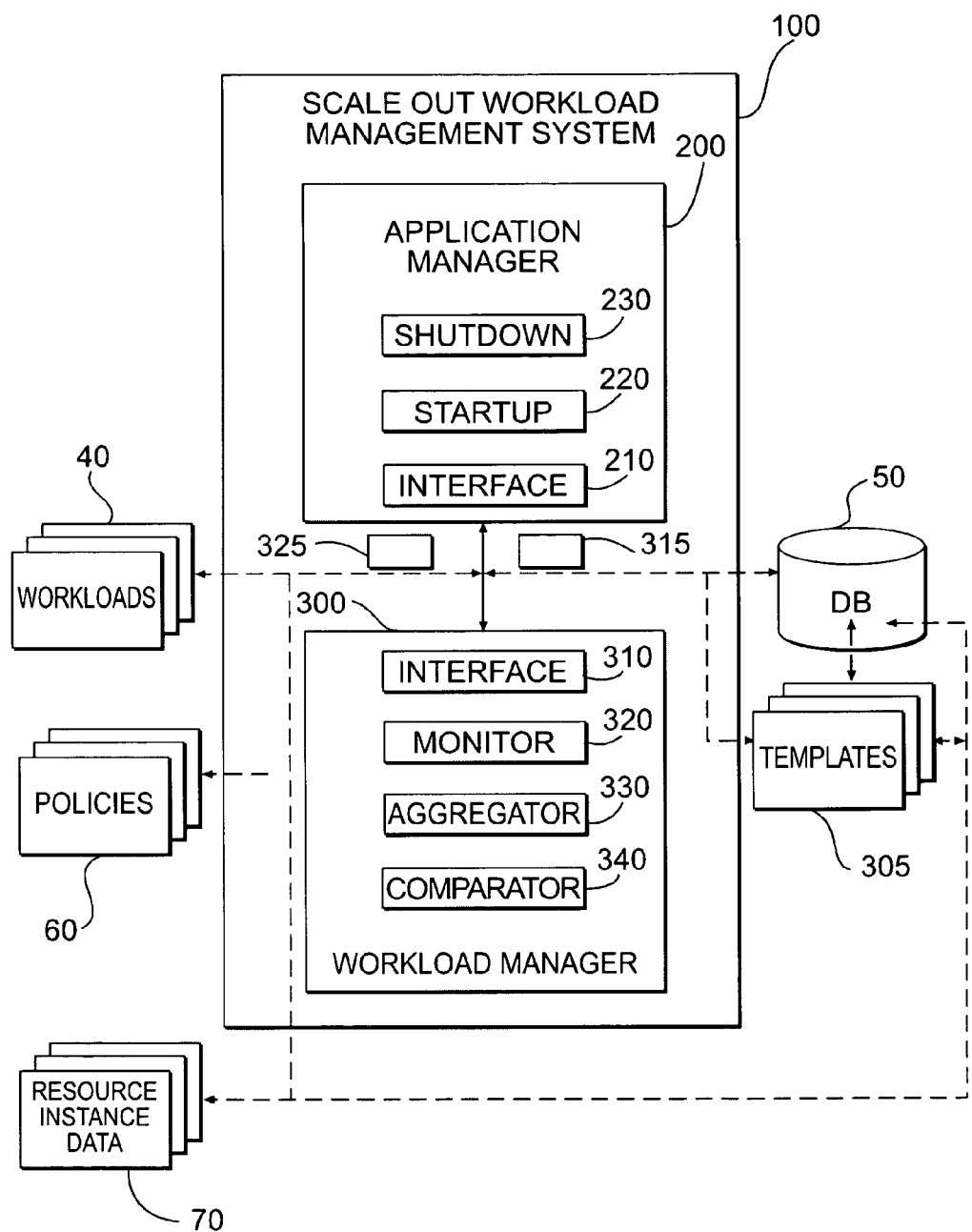
FIG. 2 illustrates an exemplary scale out workload management system for controlling allocation of computer system resources to multiple scale out workloads.

FIG. 2 is a block diagram of the exemplary scale out workload management system 100 that may be used with the system 10 of FIG. 2 to automatically manage multiple scale out workloads 40 executing on the system 10 so as to minimize resource costs, including minimizing energy consumption when executing the workloads 40. The scale out workload management system 100 includes an application manager 200 in communication with the workloads 40 and with workload manager 300, as shown. Also coupled to the application manager 200, and to the workload manager 300, is database 50. The database 50 may be used to store information relative to the performance of individual workloads 40 and to individual processors/partitions 30/32, for example. The database 50 may store logical server templates 305, resource instance data 70, and policies 60. The logical server templates 305 are used to identify and define resource instances that may be allocated to a workload 40. Additional resource instance data 70 may include performance targets for each resource instance. Policies 60 define rules for allocation of the resource instances to a workload 40, and may be user-defined, or provided with the computer system and/or the workload 40.

The application manager 200 includes interface module 210, which provides for machine-to-machine interface, including accessing the database 50, and man-to-machine interface; startup module 220, which is used to initiate execution of a workload 40 and a node; and shutdown module 230, which is used to initiate shutdown of an executing workload 40 and a node.

Normal shutdown of a resource instance, or node, is completed in a deliberate, or gradual, fashion so as to not interrupt any existing or soon to exist transaction that is a functional element of a scale out workload 40. For example, a workload 40 that provides for an on-line shopping site may be processing many transactions in parallel between a customer of the on-line shopping site and the site itself. Those shopping transactions that currently are executing, or for which a customer has begun entering buying information, may be identified by the application manger 200 and allowed to continue to completion once the shutdown module 230 issues a shutdown command. Conversely, if a customer is visiting the site, but does not initiate a purchase function until after a shutdown command is received, then that customer's purchase request would be routed to another server. Thus, one function of the application manager 200 is to track actual functions/operations currently executing as a consequence of operating the workload 40, and to determine which of the functions/operations of that workload 40 to shutdown and which to leave in operation. This determination may be provided explicitly by a system user (e.g., retain in operation, any transaction for which a shopping cart has been filled; retain in operation any transaction for which a check out page has been accessed and at least one data entry placed). Alternatively, the user may specify rules that are to be executed by the application manager 200. The rules may be selected from a set of default rules, or may be created by the system user, for example.

The application manager 200 also provides for the identification or definition of logical server templates 305. Each logical server template defines or describes an execution environment and its associated software set, that, when instantiated, can support a workload 40 being managed. A logical server template 305 would identify, for example, that one execution environment in which the template 305 can be executed includes a X86 physical server of specified characteristics, that the software to be executed in that hardware environment includes a specified Operating System (OS) type and version and the specified workload software modules, and that the workload 40 requires some number of network addresses and certain types and quantities of disk storage. For each workload 40 being managed, one or more logical server templates 305 would be defined. Each such template 305 would identify a server configuration on which the workload 40 would be executed. Some execution environments would be suitable (with different degrees of suitability) to support more than one workload 40. In this case, each such workload 40 would have a template 305 defined that can be used to select or specify the same execution environment. Consequently, both such workloads 40 would be able to scale out to use physical or virtual servers that match such a template 305.

The application manager 200 also defines logical server instances, which are sets of data that follow the format of the logical server templates 305, each instance of which can be used to initiate execution of a single instance of the workload 40 in a compatible execution environment. Thus, a logical server instance could identify, for example, the networked storage location of the workload software to be executed, specific network addresses to be assigned to this particular instance of the workload 40, and disk file systems to be used by the executing workload 40.

The application manager 200 also associates (on request) a particular logical server instance with a particular execution environment and initiates the execution of the software defined by the logical server instance in that execution environment.

Finally, the application manager 200 provides for gradually shutting down the execution of a workload 40 and, optionally, the associated execution environment (on request).

The workload manager 300 provides for the automated determination of changes to the workload/execution environment configuration that are needed to continue optimal performance of the computer system 10, specifically optimizing energy consumption by the computer system 10 when executing the scale out workloads 40.

The workload manager 300 also provides for user designation of one or more scale out workloads 40 and the associated execution environments to be managed, and the user specification of policies to control the management. Logical server templates 305 defined for a workload 40 to be managed are used to identify, from the pool of available execution environments, those execution environments that are capable of supporting each workload 40. Policies serve to specify the relative priority of the multiple workloads 40 being managed and provide the rules under which the workload manager 300 can allocate execution environments from the available pool execution environments to the workloads 40.

The workload manager 300 further provides for periodic monitoring of currently executing environments for all of the managed scale out workloads 40, in particular gathering performance metrics from each execution environment. For example, the average aggregate utilization over all the server instances that are executing a workload 40 being managed is a metric that can serve as a proxy for performance of that workload.

The workload manager 300 also provides for the aggregation of performance metrics and comparison with user specified operating targets to determine if each workload 40 is operating within target ranges.

Finally, the workload manager 300 provides for the allocation of resources to multiple workloads 40 according to the user specified policies. Using the workload operating characteristics determined from monitoring individual execution environments, alternative possible assignments of execution environments to workloads 40 are evaluated, and the assignment affording the best combination of minimizing energy consumption while keeping workload operational parameters within target ranges is selected.

The workload manager 300 includes interface module 310, which provides machine-to-machine interface, including accessing the database 50, and man-to-machine interface; monitor module 320, which is used to monitor and collect performance of the workloads 40 and the processors 30; aggregator 330, which is used to process and store the collected performance information; and comparison module 340, which is used to compare the collected and processed performance information to specified targets.

The workload manager 300 may be used to automatically determine which of the workloads 40 that are executable on the computer system 10 are available for scale out operations. Alternatively, the computer system user may provide this information to the workload manager 300 using the interface module 310. In addition to determining which of the workloads 40 can use the scale out function, the workload manager 300 can be used to determine which specific execution environments can be managed, and which user-specified policies may be applicable to that management. In an embodiment, the workload manager 300 may access the logical templates 305 that define, as noted above, which workloads can be managed according to the scale out function, and which specific computer system resource instances can be used to support the scale out function.

The monitor module 320 collects various performance metrics from each execution environment that is executing for a specific workload 40. For example, the monitor module 320 may collect individual processor utilization over all server instances on which a workload 40 is executing. As noted above, such processor utilization may be used as a direct or indirect indication for performance of the workload 40

The aggregator 330 receives the collected performance metrics, processes the metrics, and produces a "report" 315. The report 315 may be provided to the computer system user in electronic and hard copy formats. The aggregator 330 may additionally store the processed metric information in the database 50.

The comparator module 340 receives the processed metric information directly from the aggregator 330, or, alternatively, retrieves the processed performance metric information from the database 50. The comparator module 340 then compares the performance information to a set of threshold values.

When the workload manager 300 determines that a change in the configuration of nodes assigned to one or more workloads 40 is warranted, requests 325 for those changes (e.g., start or stop a node) are passed to the application manager 200 to be put into effect.

If a node is to be started, the logical server instance to be executed on the node may be specified by the workload manager 300 to the application manager 200. Alternatively, the application manager 200 may select a particular instance given a logical server template 305 identification. In either case, a list of the logical server instances that support each workload is maintained and a selection made of a logical server instance to be associated with and executed upon the selected execution environment. This function may be performed in the workload manager 300, as availability of logical server instances will constrain which execution environments are able, at any given time, to support a given workload 40. Consequently, resource instance allocation includes selection of logical server instances as well as execution environments.

If a node is to be stopped, the application manager 200 determines and executes the sequence of operations to be executed based upon the logical server templates 305 and associated resource instances to be shutdown.

If the aggregated metrics indicate that a workload 40 can operate within its target range with fewer resources than currently are supporting the workload (e.g., average processor utilization is less than a specified threshold), the workload manager 300 will attempt to select one or more resource instances (nodes or execution environments) that can be shutdown while still leaving the workload 40 functioning within its target performance range. Selection criteria may include expected energy savings, current load being handled by the node(s), and predicted performance of the workload if the node(s) is shutdown. Thus, the workload manager 300 will identify the best combination of nodes to provide the desired performance by the workload 40.

If the aggregated performance metrics indicate that the workload 40 requires more resources in order to continue to operate within the workload's performance target range (e.g., average processor utilization is greater than a specified threshold), the workload manager 300 will attempt to select one or more resource instances (nodes or execution environments) which, when started up, will bring the aggregate performance of the workload 40 within its target performance range. Selection criteria may include expected additional energy costs, time required to bring the new node(s) on line, and predicted workload performance if the node(s) is started. Again, the workload manager 300 will identify the best combination of nodes to provide the desired performance by the workload 40.

However, because multiple workloads 40 are executing on the computer system 10, the workload manager 300 must consider not only each workload 40 individually, but, absent some user-stated policy to prefer one workload over another, also may consider the overall performance of all the workloads when determining how to reallocate nodes from the pool of existing nodes. In this situation, no one workload may receive an optimum allocation of nodes and resources; rather, the allocation of nodes and resources is optimized over the universe of executing scale out workloads.

As an example of this optimization balancing operation performed by the workload manager 300, consider an Internet Web site that supports 1) online booking and purchase of airline tickets, and 2) online checking of flight and airport status. The online booking and purchase is designated workload A and the online checking is designated workload B. The Web site is supported by multiple servers 20, each with multiple, but heterogeneous, processors, with a total pool of eight processors (1-8) to support workloads A and B. Assume further that processors 1-4 have twice the processing capacity as processors 5-8, that during the hours 8 am to 4 pm, workload A normally is supported by processors 1-3 and workload B normally is supported by processors 4 and 5. However, during certain times of the year, or in the event of violent weather, the demand on workloads A and B change from what is normally experienced: during the Thanksgiving holiday period (condition 1), the demand on workload A doubles but the demand on workload B is the same; during violent weather (condition 2), the demand on workload B doubles and the demand on workload A remains the same. To optimize the performance of workload A during condition 1, all processors 1-8 would have to be assigned to workload A, which of course means that workload B would be unsupported. During condition 2, workload B could be optimized by assigning processors 4-8 to workload B, which would not affect workload A. Thus, for condition 1, to obtain an overall optimization of workloads A and B, the workload manager 300 would have to decide how much of a performance degradation workload A would experience to provide at least marginal performance of workload B. In other words, one or more nodes may be removed from workload B in order to give increased support to workload A.

When the workload manager 300 determines that a change in the set of resource instances (nodes) supporting the workloads 40 is required, the workload manager 300, through the interface module 310, sends a request 325 for that change (e.g. start or stop a resource instance) to the application manager 200, and the application manager 200 implements, if possible, the desired change.

Because the scale out workload management system 100 simultaneously controls multiple scale out work loads 40, change requests 325 may require sequencing. For example, a node may be switched from one workload 40 to another workload 40, in which case, a request 325 to shutdown the currently executing workload 40 will be followed by a request 325 to initiate the new workload 40. In this situation, the current workload 40 is shutdown gradually, but the node is not powered down, since the node will be immediately started with a different workload 40.

Operating system instances to be managed may be whole physical servers, hard or soft partitions of physical servers, or virtual machines, as long as the logical server instances can be defined for them and executed upon them. The nodes to be managed may be capable of supporting one, several, or all of the workloads 40 under management. The allocation scheme will allocate nodes only to workloads 40 that can use the nodes, and will take into account the relative efficiency with which a particular node may execute the workloads 40 that it supports.

Thus, the system 10 provides for automatic management of multiple scale out workloads so as to minimize the computing resources (and hence the related energy consumption) required to achieve the performance targets established for the workloads 40. Automatic management provides for reduced cost and better matching of resources to actual demand as compared to manual management. Automatic management of heterogeneous resources (e.g., use of both virtual and physical execution environment) provides more flexibility than managing only homogeneous resources (e.g., only virtual machines) as well as potential for a better match between required and available resources. Automatic management of heterogeneous workloads from a single resource pool provides more efficiency in use of computing resources as opposed to using separate pools for each workload, and thus reduces energy consumption by the computer system 10.

Figure 3:
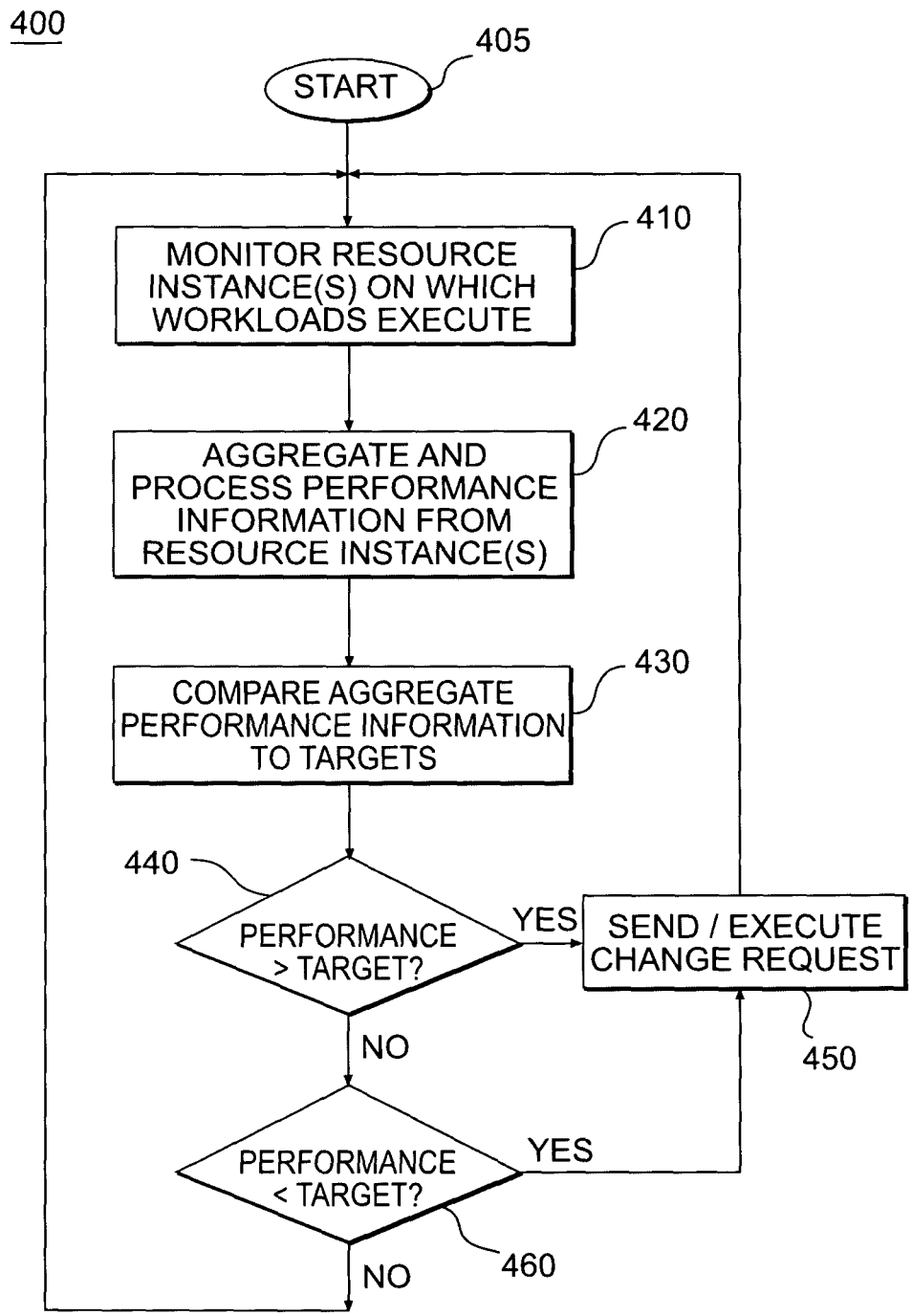
FIG. 3 is a flowchart illustrating an exemplary scale out workload management process.

FIG. 3 is a flowchart illustrating an exemplary operation 400 of the scale out workload management system 100 of FIG. 2 executing on the computer system 10 of FIG. 1 to simultaneously control multiple scale out workloads 40. The operation 400 starts in block 405 when the workload manager 300 determines which of the workloads 40 are executable on the computer system 10 and are available for scale out operations. Alternatively, the computer system user may provide this information to the workload manager 300. The workload manager 300 also determines which specific resource instances can be managed, and which user-specified policies may be applicable to that management.

In block 410 the monitor module 320 collects various performance metrics from each execution environment that is executing for each specific workload 40. For example, the monitor module 320 may collect individual processor utilization over all server instances on which a workload 40 is executing.

In block 420 the aggregator 330 receives the collected performance metrics for each workload instance, processes the metrics, and produces the report 315, which is an aggregation of the individual performance metrics from each execution environment for a particular workload 40, and which may be used by other components of the scale out workload management system 100.

In block 430 the comparator module 340 receives the processed and aggregated metric information directly from the aggregator 330, or, alternatively, retrieves the processed performance metric information from the database 50. The comparator module 340 then compares the aggregated performance information to a set of threshold values. The threshold values may be constant over time, or may vary, for example by time of day or day of week.

In block 440 the workload manager 300 determines if the aggregated performance metrics for each of the executing workloads 40 indicate that the workload 40 requires more resources in order to continue to operate within the workload's performance target range (e.g., average processor utilization is greater than a specified threshold). For example, the workload manager 300 may "look ahead" to a future time period and "predict" what workload demand likely will be, and what performance threshold is appropriate for that future period. In a simple example, the workload manager 300 might determine that one of the workloads 40 will require a doubling of its node assignments for a coming 12-hour time period just to meet the current performance level desired for that workload. In block 440, if the answer is yes, the operation moves to block 450. Otherwise, the operation 400 moves to block 460.

In block 450 the workload manager 300 determines that a change in the set of resource instances supporting one or more of the workloads 40 is required, and the workload manager 300, through the interface module 310 sends a request 325 for that change (e.g. start or stop one or more workload instances and the corresponding resource instances) to the application manager 200, and the application manager 200 implements, if possible, the desired change. If a resource instance is to be started, the logical server instance to be executed on the resource instance may be specified to the application manager 200. Alternatively, the workload manager 300 may select a particular resource instance given a logical server template identification. If a resource instance is to be stopped, the application manager 200 determines and executes a sequence of shutdown operations based on the logical server template associated with the resource instance to be shut down, and the workload manager 300 will attempt to select one or more resource instances (nodes or execution environments) that can be shutdown while still leaving the workload functioning within its target performance range. Selection criteria may include expected energy savings, current load being handled by the resource instance(s), and predicted performance of the workload if the resource instance(s) is shutdown. If a resource instance is to be switched from a first workload 40 to one or more second workloads 40, then the resource instance is maintained in operation and only the workload instance is shutdown. That is, a workload 40 is stopped, gradually, on any node that is changing its support for the workloads as a result of the reallocation of nodes, and any node that is stopped but is to be started to support the reallocation of nodes is started. Note also that one workload 40 may simply swap resource instances with another workload 40, in which case, the two (or more) resource instances are maintained in operation and the applicable workloads 40 are stopped and then restarted on their new resource instances.

In block 460 the workload manager 300 determines if the aggregated metrics indicate that the workload 40 can operate within its target range with fewer resources than currently are supporting the workload 40 (e.g., average processor utilization is less than a specified threshold). If yes, the operation 400 moves to block 450. Otherwise, the operation 400 returns to block 410.

The various disclosed embodiments may be implemented as a method, system, and/or apparatus. As one example, exemplary embodiments are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from a long-term storage media of some type, such as semiconductor, magnetic, and optical devices, including a removable disk or a hard drive. The code may be distributed on such media, or may be distributed to network operators from the memory or storage of one computer system over a network of some type to other computer systems for use by operators of such other systems. Alternatively, the programming code is embodied in the memory (such as memory of a handheld portable electronic device) and accessed by a processor using a bus. The techniques and methods for embodying software programming code in memory, on physical media, and/or distributing software code via networks are well known and will not be further discussed herein.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A computer-implemented process comprising:
   monitoring nodes executing instances of workloads to gather respective performance metrics, said workloads including plural scale-out workloads each having plural scale-out instances,
   for each of said scale-out workloads, aggregating by a computer the performance metrics across instances of the scale-out workload to obtain an aggregate performance metric representative of an aggregate performance of the scale-out workload so as to obtain respective aggregate performance metrics for said scale-out workloads; and
   based at least in part on said aggregate performance metrics, allocating by a computer an additional node to at least one scale-out workload by selecting a node on which a logical-server template for said scale-out workload has been instantiated or by instantiating a logical-server template said additional node, said additional node being a physical server, a hard or soft partition of a physical server, or a virtual machine.

2. A process as recited in claim 1 further requiring making a request specifying said logical-server template or a node on which said logical-server template has been instantiated additional node and either.

3. A process as recited in claim 2 wherein said logical-server template specifies resource requirements for said scale-out workload.

4. A process as recited in claim 2 wherein said request specifies resource requirements for said workload and a network address to be adopted by said node when said logical-server template is instantiated on said node so as to define a logical-server instance of said logical-server template.

5. A process as recited in claim 2 wherein said logical-server template is selected from plural logical-server templates respectively specifying different resource requirements for said scale-out workload.

6. A system comprising non-transitory computer-readable storage media encoded with code defining:
   a workload manager to, when executed by a processor,
      monitor nodes executing instances of workloads to gather respective performance metrics, said workloads including plural scale-out workloads each having plural active scale-out instances,
      aggregate the performance metrics across the active scale-out instances for each of said plural scale-out workloads to obtain respective aggregate performance metrics representative of an aggregate performance of said scale-out workloads, and
      based at least in part on said aggregate performance metrics, request an additional node be allocated to at least one scale-out workload, the request specifying the additional node and
      a logical-server template; and
   an application manager to, when executed by said processor, fulfill said request by selecting a node on which a logical-server template for the scale-out workload has been instantiated or by instantiating such a logical server template on a node, said node being a physical server, a hard or soft partition of a physical server, or a virtual machine.

7. A system as recited in claim 6 further comprising said processor.

8. A system as recited in claim 6 wherein said request specifies said logical-server template and said logical-server template specifies resource requirements for said scale-out workload.

9. A system as recited in claim 6 wherein said request specifies a network address to be adopted by said node when said logical-server template is instantiated on said node.

10. A system as recited in claim 6 wherein said code further defines plural logical-server templates respectively specifying different resource requirements for said scale-out workload.

\* \* \* \* \*